Feb. 25, 1964     C. E. SHOOK ETAL     3,122,029
OVERDRIVE CONVERSION UNIT AND METHOD OF USING SAME
Filed May 25, 1961     2 Sheets-Sheet 1
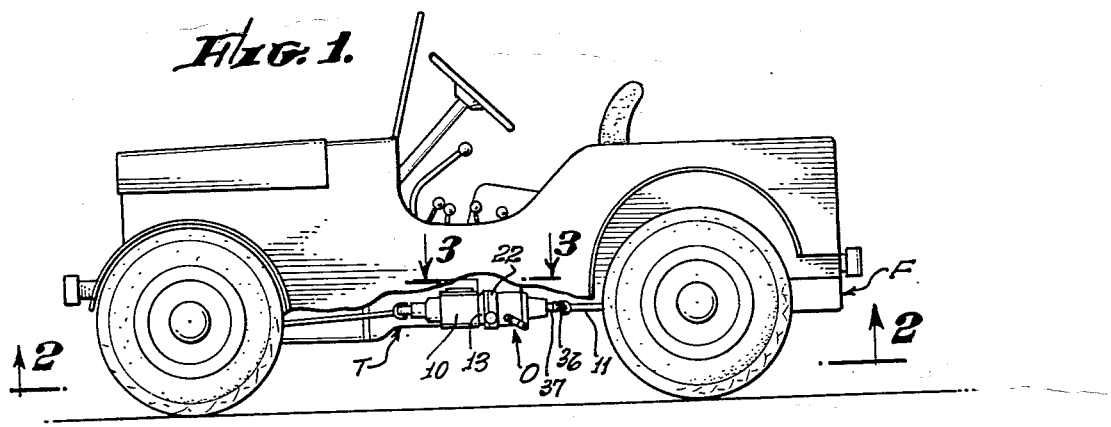
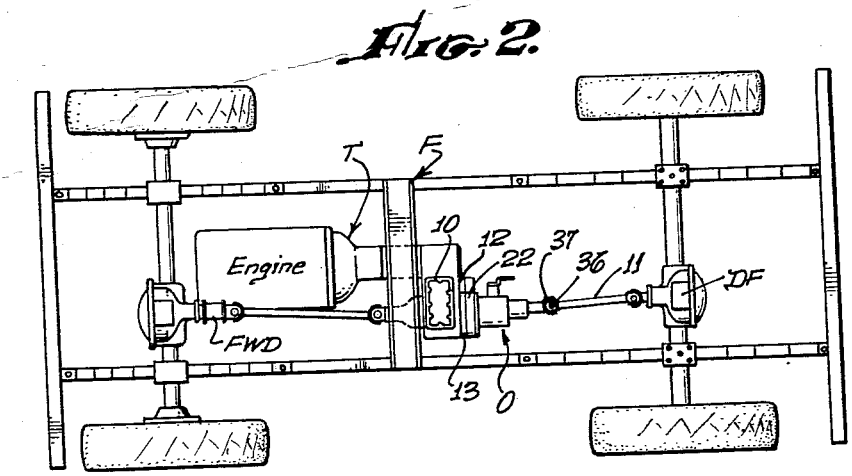
BASIL E. SMITH,
CLARENCE E. SHOOK,
INVENTORS.
BY William C. Babcock
ATTORNEY.

Feb. 25, 1964 C. E. SHOOK ETAL 3,122,029
OVERDRIVE CONVERSION UNIT AND METHOD OF USING SAME
Filed May 25, 1961 2 Sheets-Sheet 2
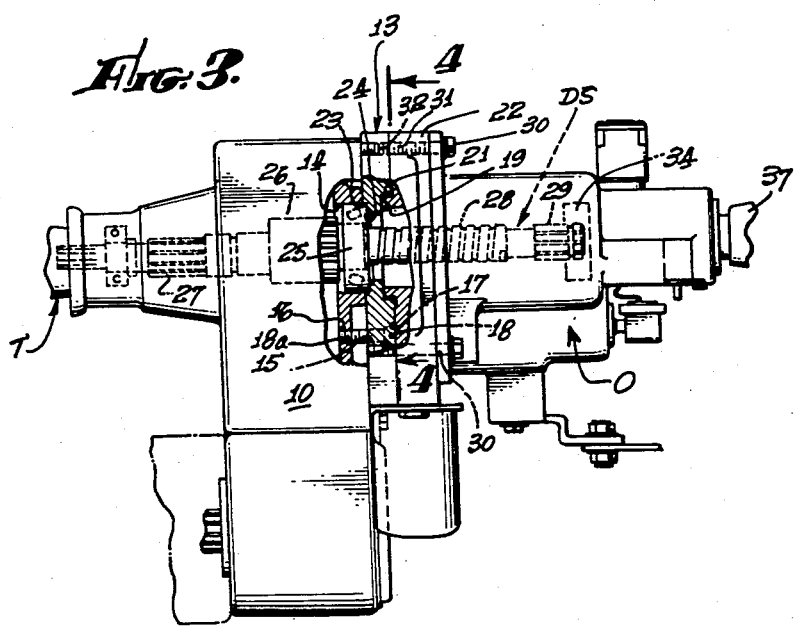
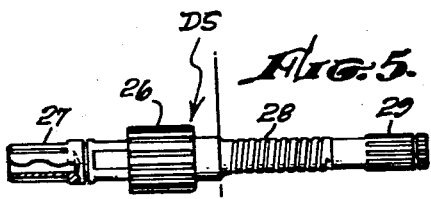
Conventional Transfer Case Shaft Section | Conventional Overdrive Shaft Section
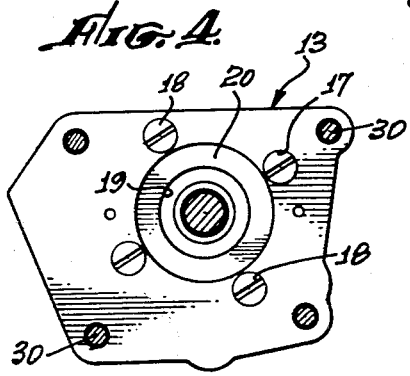
BASIL E. SMITH,
CLARENCE E. SHOOK,
INVENTORS.
BY William C. Babcock
ATTORNEY.

United States Patent Office 3,122,029
Patented Feb. 25, 1964

3,122,029
OVERDRIVE CONVERSION UNIT AND METHOD OF USING SAME
Clarence E. Shook, Lakewood, Calif. (6309 Paramount Blvd., Long Beach 5, Calif.), and Basil E. Smith, El Monte, Calif. (2118 N. Lee, South El Monte, Calif.)
Substituted for abandoned application Ser. No. 743,559, June 23, 1958. This application May 25, 1961, Ser. No. 116,912.
2 Claims. (Cl. 74—606)

The present invention relates generally to the field of automotive equipment, and more particularly to an apparatus and method of using the same by which it is possible to convert a four-wheel driven vehicle to include an overdrive.

As is well known, a four-wheel drive automotive vehicle is ideally suited for traveling over rough, hilly country such as is frequently encountered in fishing and hunting expeditions. However, one disadvantage of such vehicles is that they have a limited top speed, and therefore are not suited for traveling on modern highways for long distances. In the past, this disadvantage has restricted four-wheel drive vehicles to specific and restricted uses, rather than for all 'round use thereof.

A major object of the present invention is to provide an apparatus and method of using the apparatus by which a four-wheel drive vehicle can be converted to include an overdrive, even if the transmission of the vehicle is short-coupled.

Another object of the invention is to provide an apparatus and method of using the same that will give the four-wheel drive vehicle on which the apparatus is installed greater versatility of use, and permit the vehicle to be driven at high speed over a highway prior to its use in traveling over rough and hilly terrain.

Yet another object of the invention is to supply an apparatus that is of simple mechanical structure which can be installed without difficulty in a four-wheel drive vehicle, and which is so inexpensive to produce that it can be sold at a sufficiently low price as to encourage its widespread use in the conversion of four-wheel drive vehicles to include an overdrive.

These and other objects and advantages of the invention will become apparent from the following description of a preferred form thereof, and from the accompanying drawing illustrating the same in which:

FIGURE 1 is an elevational view of a four-wheel drive vehicle which is partially cut away to show the disposition of overdrive conversion;

FIGURE 2 is a bottom view as indicated by the arrows 2—2 in FIGURE 1;

FIGURE 3 is an enlarged plan view of the conversion, partially in section, taken on line 3—3 of FIGURE 1;

FIGURE 4 is an elevational view taken on line 4—4 of FIGURE 3 showing the adapter plate; and FIGURE 5 is an elevational view in complete detail of the special conversion drive shaft.

Referring now to the drawings for the general arrangement of the invention, a four-wheel drive vehicle is shown in FIGURES 1 and 2 which includes a frame portion F. Suspended on or fixedly secured thereto is the main transmission housing T. The geared power transfer mechanism is carried in the transversely disposed housing 10 and from the forward end thereof extends the standard drive shaft providing the power means for the standard front wheel drive. This conventional drive mechanism has been designated generally as FWD. From the rear of said transfer housing 10 the standard drive shaft 11 normally extends in conventional manner to the differential DF providing power to the rear wheels of the vehicle.

In the small space between the transfer housing 10 and differential DF, a special mechanism has been provided for adapting a conventional overdrive to said elements. To accomplish this end, the standard emergency brake mechanism (not shown) is removed, which is usually carried on the standard drive shaft 11 immediately adjacent the rear face 12 of the transfer housing 10. The standard dual-splined, longitudinally disposed short drive shaft in the housing 10 is removed and a special adapter plate 13, shown in FIGURES 3 and 4, is securely attached thereto about the drive shaft opening 14 in the rear of housing 10. Adapter plate 13 is a rugged, thick steel element connected to the rear face 12 of the transfer housing 10 in the following manner.

Plural openings 15 are drilled in adapter plate 13 to coincide with threaded bores 16 in the rear face 12 of transfer housing 10. Openings 15 are countersunk at 17 to receive plural, rugged screw-headed attachment pins 18, threaded at 18a to engage said threaded bores 16. Plate 13 has a central aperture 19 formed therein that coincides with the standard drive shaft opening 14 in the transfer case or housing 10. A circumferential recess 20 is machined about said aperture 19 on the outer face of plate 13, and provides a centering and receiving portion for a cylindrical boss 21 specially machined on the attachment plate or inner end casting 22 of a conventional overdrive mechanism O from which the standard driving element or shaft and the inner shaft-bearing support have been removed. The inner face of adapter plate 13 has dual recesses 23 and 24 respectively formed therein which receive the slightly projecting front face of a standard bearing 25 of transfer case 10.

A specially designed and machined driving power connecting element is provided that unites and becomes common to both the power transfer mechanism and the conventional overdrive. Machined on the inner end of the power connecting element or drive shaft, designated generally DS, are the dual standard gear connecting splined portions 26 and 27 respectively. The outer end of drive shaft DS is machined to conform exactly to the standard worm 28 and splined portion 29 of the shaft previously removed from the overdrive mechanism O. The plate or casting 22 of the overdrive mechanism O is attached to adapter plate 13 by means of four threaded bolts 30 which pass through plural apertures 31 in plate 22 of the overdrive and are received in plural threaded bores 32 in attachment plate 13.

The actual disposition of the combined power connecting and drive shaft member DS is best shown in FIGURE 3. It will be noted that the association of relative parts and centering of the adapter plate 13 and attachment plate 22 by means of the recess 20 and boss 21 actually results in perfect alignment of the special shaft DS in standard bearing 25 in the transfer casing 10 and a conventional bearing 34 in the overdrive mechanism. The drive shaft 11 operatively connected to the rear differential mechanism DF is shortened in such manner that it can be connected by a universal joint 36 to the attachment coupling 37 on the outer end of the overdrive mechanism.

As far as the operation of the device is concerned, it is believed obvious from the above description that there has been no change whatsoever affecting the normal four-wheel drive transmission means and that when the overdrive mechanism has been adapted to the transfer means and rear wheel drive the four-wheel drive vehicle will have greatly improved road characteristics on the open highway.

Although our invention is fully capable of achieving the results and providing the advantages hereinbefore mentioned, it is to be understood that it is merely the presently preferred embodiment thereof, and we do not mean to be limited to the details of construction above described other than as defined in the appended claims.

We claim:

1. A four-wheel drive automotive vehicle having a transmission, power transfer unit, differential and differential drive shaft that is characterized by an overdrive conversion unit associated therewith, said unit consisting of: an apertured adapter plate secured to the power transfer mechanism thereof, said plate having a centering recess machined therein; an adapter power-transferring drive shaft having dual splined portions at one end thereof conforming to but replacing the removed originally provided power transfer drive shaft, the opposite end of said adapter drive shaft being machined to overdrive form and dimensions; and an overdrive mechanism operatively receiving said overdrive end of said adapter shaft, said overdrive mechanism having an inner attachment face for connection with said adapter plate, said face being machined to form a boss engaging said attachment plate centering recess and thus aligning said adapter shaft to exclude the use of an original provided front bearing element, said overdrive mechanism at its outer end being connected to a shortened end of said differential drive shaft.

2. A device as defined in claim 1 wherein said adapter plate is first secured to the rear face of said transfer housing and said overdrive attachment face is fixedly connected to said adapter plate.

References Cited in the file of this patent

UNITED STATES PATENTS

| | | |
|---|---|---|
| 2,811,049 | Dennis | Oct. 29, 1957 |
| 2,835,143 | Kelbel | May 20, 1958 |
| 2,936,648 | Barnes | May 17, 1960 |